Patented Nov. 28, 1922.

1,437,257

UNITED STATES PATENT OFFICE.

ROYAL MATTICE, OF PHILADELPHIA, PENNSYLVANIA.

PROCESS OF WELDING AND APPARATUS THEREFOR.

Application filed March 10, 1921. Serial No. 451,164.

*To all whom it may concern:*

Be it known that I, ROYAL MATTICE, a citizen of the United States, residing at Philadelphia, in the county of Philadelphia and State of Pennsylvania, have invented certain new and useful Improvements in Processes of Welding and Apparatus Therefor, of which the following is a specification.

This invention has to do with certain improvements in processes and apparatus for welding. It has particular reference to a process and apparatus for the welding of iron and steel objects either by the electrical or acetylene methods. In order that the invention may be better understood and its relationship to the prior art may be better appreciated, I will first explain briefly certain of the conditions and difficulties encountered in welding by previous processes and apparatus.

The iron or steel objects to be welded together carry a greater or less percentage of carbon. When the parts are heated during the welding operation, this carbon tends to concentrate at the point of weld with the result that the percentage of carbon, and in some cases other materials, tends to increase at the point of weld. This is a great objection in many cases since the percentage of carbon is thereby apt to rise, and frequently does rise, to such an amount that the metal at the weld becomes much more brittle and hard than elsewhere. The result is that the welded parts frequently break at the weld; besides which the material at the weld becomes so hard as to make it difficult or impossible to properly machine the material at and adjacent to the weld.

It has been discovered that copper when introduced into cast iron tends to oppose the carbon, so that if the copper should be introduced into the iron at a definite point, it will tend to hold back the carbon from such point; and this tendency is largely proportional to the percentage of copper so introduced. Furthermore, cast iron, which has more than 2.2 percent of carbon, tends to deposit so much carbon in the added metal of the weld as to make it brittle and objectionable. This is because the carbon of the cast iron tends to "seek its level".

By using an electrode during the welding operation, which electrode in itself carries a large percentage of copper, it is possible to dam back the carbon of the "parent metal", thereby preventing the accumulation of carbond at the point of weld to such an extent as to entirely overcome all of the objections hereinbefore enumerated. In this way it is possible to produce a weld of equal strength and toughness to the remaining portion of the parent metal, and also to produce a weld which can be readily machined and finished, and one which to all appearance cannot be distinguished from the parent metal.

I propose to introduce the copper in any convenient manner, but preferably I introduce at the point of weld and simultaneously with the welding operation. Furthermore, I propose to introduce the copper through the medium of any convenient instrumentality; but I prefer to introduce it by carrying it in the electrode itself. When copper is introduced by carrying it in the electrode itself, this may be done either by alloying a large percentage of copper with the metal of the electrode, or by using a stranded electrode having one or more strands of copper or one or more strands of alloy metal with a substantial percentage of copper; or by forming the electrode or one of the strands thereof partially of copper, as for instance, by providing the same with copper coating. Other arrangements might also be adopted for supplying the copper as a portion of the electrode.

The percentage of copper introduced into the cast iron at the point of weld may be very high. For example, amounts of copper up to 30% have thus been introduced into the metal in the weld and adjacent thereto, and amounts as high as 50% can be so introduced.

The ability to introduce the copper in this manner is of great value, not only for the welding together of different objects or different parts of some object, but also in such cases as the filling of blow holes in castings.

In such cases, it is possible to perfect the imperfect castings, thus in many cases making it possible to use castings of large size or complicated form which might otherwise have to be discarded.

As a matter of convenience and by way of illustration, I have shown in the drawing several forms of electrodes which may be used according to the present process. I have, therefore, shown in—

Fig. 1 a side elevation on greatly enlarged scale of a section of stranded electrode embodying the features of the present invention, in which the center strands are made of copper or high percentage copper alloy material, while the outside strands are of ordinary composition;

Figure 1:
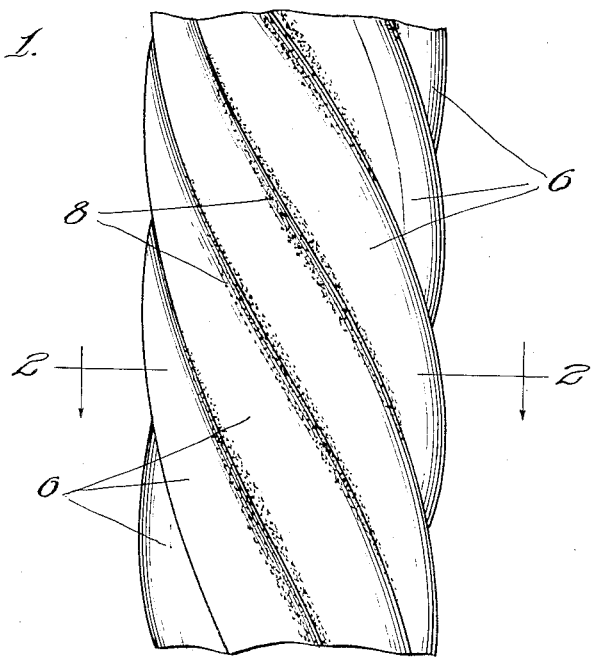
Figure 2:
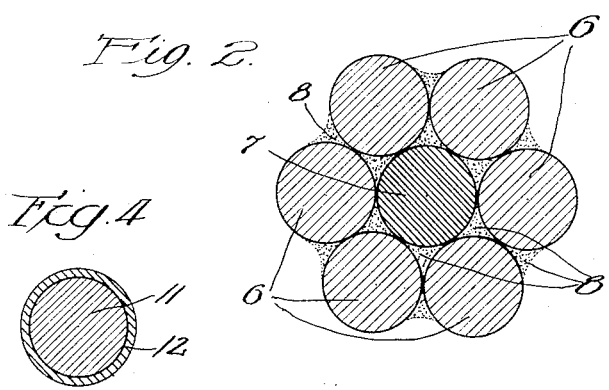
Fig. 2 shows a cross section taken on the line 2—2 of Fig. 1, looking in the direction of the arrows.

Referring first to the electrode shown in Figs. 1 and 2, the same includes a series of outside strands 6 of ordinary composition such as mild steel, together with a center strand 7 of copper or the like. The ratio between the mass of copper and the mass of mild steel will in such case be approximately one to seven, so that the copper will constitute approximately 14½–15% of the total electrode. If desired, a suitable flux material such as resin or the like 8, may be introduced into the flutes or spaces between the strands so that the electrode will also be self cleansing when used.

The difference between the composition of the inner and outer strands of this electrode is shown by the difference in the direction of the cross hatching in Fig. 2.

Figure 3:
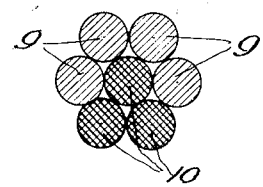
Fig. 3 shows a cross section similar to that of Fig. 2, with the exception that it shows a modified form of stranded electrode, in which one or more of the strands are made of high percentage copper alloy metal.

In the modified electrode shown in Fig. 3, I have provided the copper as a portion of one or more of the strands of the electrode; and in the particular electrode shown in Fig. 3, the strands 9 are of ordinary mild steel whereas the strands 10 are of high copper alloy; the ratio between the amounts of steel and copper being such as to give the desired percentage of copper in the complete electrode. The fact that the strands 10 are of high copper alloy is shown by the double cross hatching of these particular strands.

Figure 4:
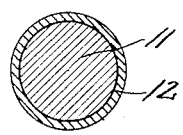
Fig. 4 shows another modified form of electrode of solid form and having an outside layer of copper.

The modified electrode shown in Fig. 4 is solid, one portion being of steel and another portion being of copper. In the form illustrated, the center 11 is of steel and the surrounding portion 12 is of copper, being in effect a copper coating on a steel center. This is in effect a reversal of the arrangement of the electrode of Figs. 1 and 2 in which there is a copper center with a steel casing surrounding the same.

Figure 5:
Fig. 5, shows another modified form of solid electrode having a high percentage of copper alloy to supply the desired amount of copper in the welding operation.

The modified electrode shown in Fig. 5 is solid and consists of a high copper alloy to give the desired percentage of copper, the presence of both the steel and copper in the electrode being indicated by the double crosshatching.

I wish to point out the fact that many other arrangements of electrodes might be devised embodying the features of the present invention, and therefore, I do not limit myself to the particular forms of electrodes shown in the drawing. Neither do I limit myself to any particular percentage of copper, since it is evident in some cases that it will be desirable to use a larger percentage of this metal than in other cases. I have, however, found that 30% of copper is very desirable, since it makes it possible to secure substantially this percentage in the weld itself.

I wish also to point out the fact that the electrode herein disclosed is very well adapted for welding purposes by either acetylene or electrical processes, and therefore I do not limit myself to its use in any of these processes, except as I may do so in the claims.

I claim:

1. The process of welding cast iron or steel objects having a substantial percentage of carbon which consists in applying an electrode thereto with the application of heat, said electrode comprising ferrous material and substantially 15–30 per cent of copper, for the purpose specified.

2. As a new article of manufacture a welding electrode comprising ferrous material and substantially 15 percent of copper, substantially as described.

3. As a new article of manufacture a welding electrode having ferrous material and substantially 15% or more of copper throughout its effective length, substantially as described.

4. As a new article of manufacture a welding electrode comprising ferrous material and substantially ¼ or more of copper in desired ratios, substantially as described.

5. As a new article of manufacture a welding electrode comprising ferrous material and substantially ¼ or more of copper in substantially uniform percentages throughout its effective length, substantially as described.

6. As a new article of manufacture a welding electrode having longitudinally extending portions of ferrous material and copper in the ratio of substantially ¼ or more of copper, substantially as described.

7. As a new article of manufacture a welding electrode having at each cross-section throughout its effective length ferrous material and substantially ¼ of copper for the purpose specified, substantially as described.

8. As a new article of manufacture a stranded welding electrode having strands of ferrous material and a strand of copper, substantially as described.

9. As a new article of manufacture a stranded welding electrode comprising a central strand of copper and a plurality of surrounding strands of ferrous material, substantially as described.

ROYAL MATTICE.